(12) United States Patent
Gross

(10) Patent No.: US 10,807,501 B2
(45) Date of Patent: Oct. 20, 2020

(54) PASSENGER SEAT SYSTEM FOR A MEANS OF TRANSPORT

(71) Applicant: Airbus Operations GmbH, Hamburg (DE)

(72) Inventor: Claus-Peter Gross, Hamburg (DE)

(73) Assignee: Airbus Operations GmbH (DE)

( * ) Notice: Subject to any disclaimer, the term of this patent is extended or adjusted under 35 U.S.C. 154(b) by 222 days.

(21) Appl. No.: 16/126,327

(22) Filed: Sep. 10, 2018

(65) Prior Publication Data
US 2019/0092480 A1    Mar. 28, 2019

(30) Foreign Application Priority Data

Sep. 27, 2017    (DE) .......................... 10 2017 122 397

(51) Int. Cl.
| | | |
|---|---|---|
| *B60N 2/005* | (2006.01) |
| *B60N 2/015* | (2006.01) |
| *B60N 2/30* | (2006.01) |
| *B64D 11/06* | (2006.01) |
| *F16B 2/10* | (2006.01) |
| *F16B 2/18* | (2006.01) |
| *F16B 2/14* | (2006.01) |

(52) U.S. Cl.
CPC ......... *B60N 2/005* (2013.01); *B60N 2/01508* (2013.01); *B60N 2/3097* (2013.01); *B64D 11/0696* (2013.01); *F16B 2/10* (2013.01); *F16B 2/185* (2013.01); *F16B 2/14* (2013.01)

(58) Field of Classification Search
CPC ............ B64D 11/0696; B60N 2/01508; B60N 2/005; B60N 2/3097; F16B 2/10; F16B 2/185; F16B 2/14
See application file for complete search history.

(56) References Cited

U.S. PATENT DOCUMENTS

| | | | |
|---|---|---|---|
| 3,622,202 A | 11/1971 | Brown | |
| 4,796,837 A * | 1/1989 | Dowd ................ | B64D 11/0696 244/122 R |

(Continued)

FOREIGN PATENT DOCUMENTS

| | | |
|---|---|---|
| DE | 198 51 392 A1 | 5/1999 |
| DE | 10 2006 022 032 A1 | 12/2006 |

(Continued)

*Primary Examiner* — Valentina Xavier
(74) *Attorney, Agent, or Firm* — Lerner, David, Littenberg, Krumholz & Mentlik, LLP

(57) ABSTRACT

A passenger seat system for a transport means has a carrier structure which can be attached, fixedly with respect to a structure, and a seat having a seat frame displaceable and arrestable on the carrier structure, a bottom side lying on the carrier structure, and a top side holding a seat surface. The seat frame has an arresting device and has an operating unit, coupled to the arresting device. The operating unit is movable into an arresting position and an unlocking position, is coupled to a traction mechanism. The arresting device has an arresting body, coupled to the traction mechanism, is forced by action of a pressure spring into an engagement position, and can be moved by the traction mechanism into a release position and has a locking unit, coupled to the traction mechanism, locking the arresting body in the engagement position and releasing the locking by the traction mechanism.

14 Claims, 6 Drawing Sheets

(56) References Cited

U.S. PATENT DOCUMENTS

| | | | |
|---|---|---|---|
| 9,663,232 B1 | 5/2017 | Porter et al. | |
| 2016/0194085 A1* | 7/2016 | Stubbe | B60N 2/01558 |
| | | | 248/503.1 |
| 2018/0194476 A1 | 7/2018 | Gross | |
| 2019/0144120 A1* | 5/2019 | Danet | B64C 1/20 |
| | | | 297/463.1 |
| 2020/0122841 A1* | 4/2020 | Guillet | B60N 2/01558 |

FOREIGN PATENT DOCUMENTS

| | | |
|---|---|---|
| DE | 10 2009 028 903 A1 | 3/2011 |
| DE | 10 2013 108 540 A1 | 2/2015 |
| DE | 10 2015 116 414 A1 | 3/2017 |

\* cited by examiner

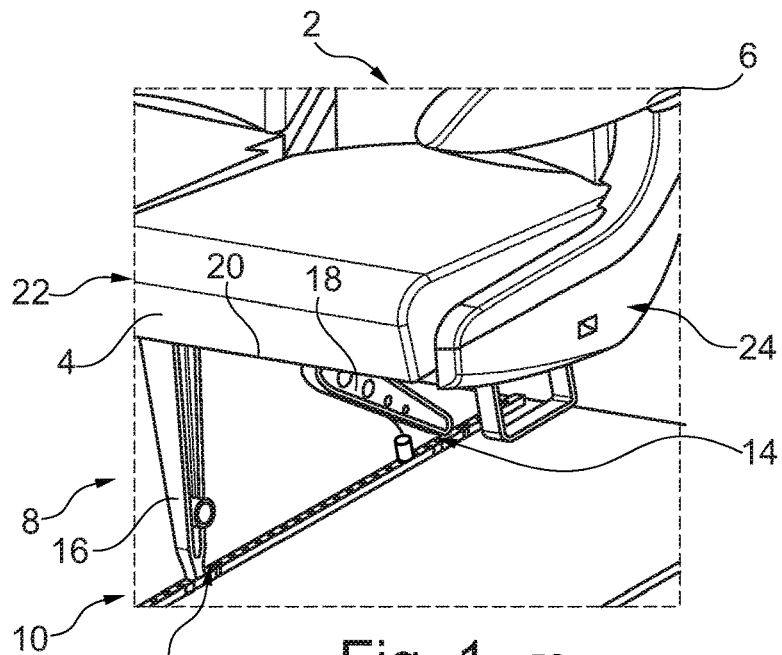
Fig. 1
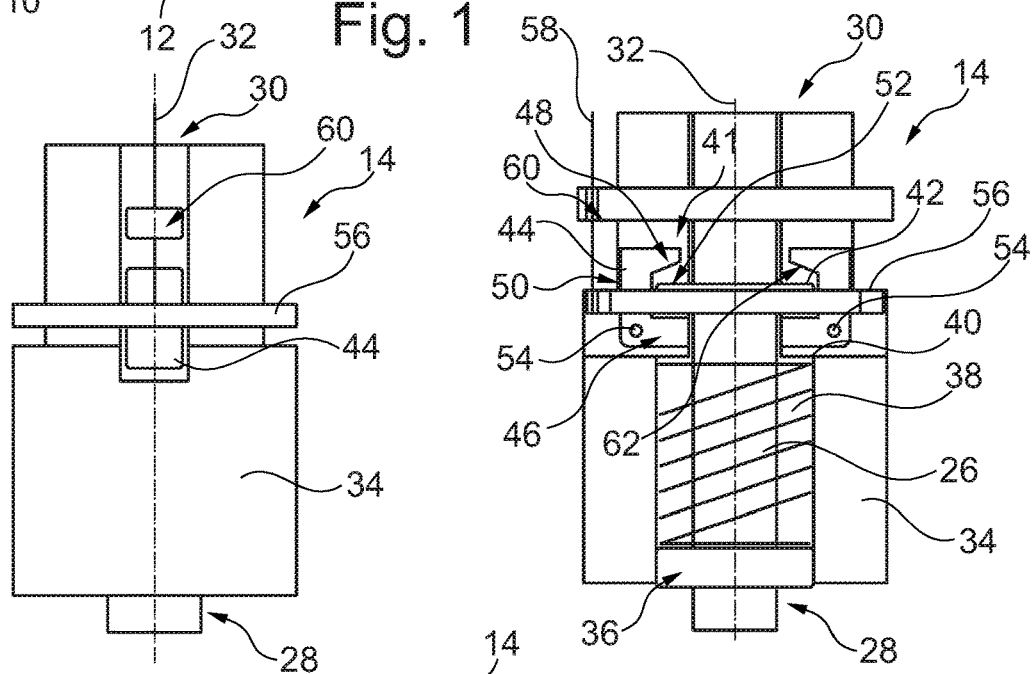
Fig. 2a
Fig. 2b
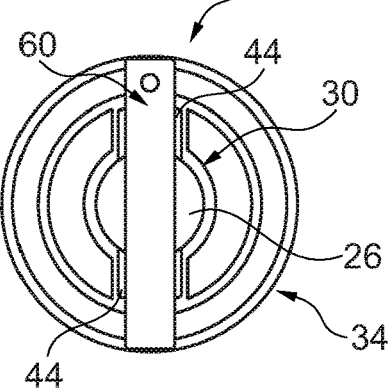
Fig. 2c

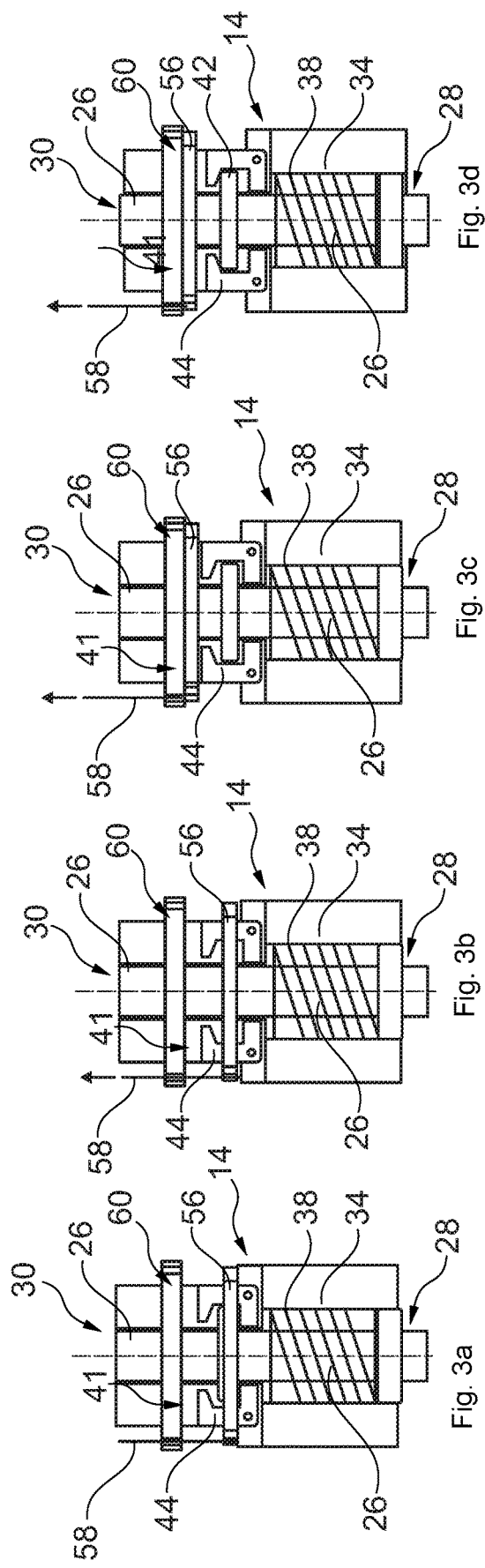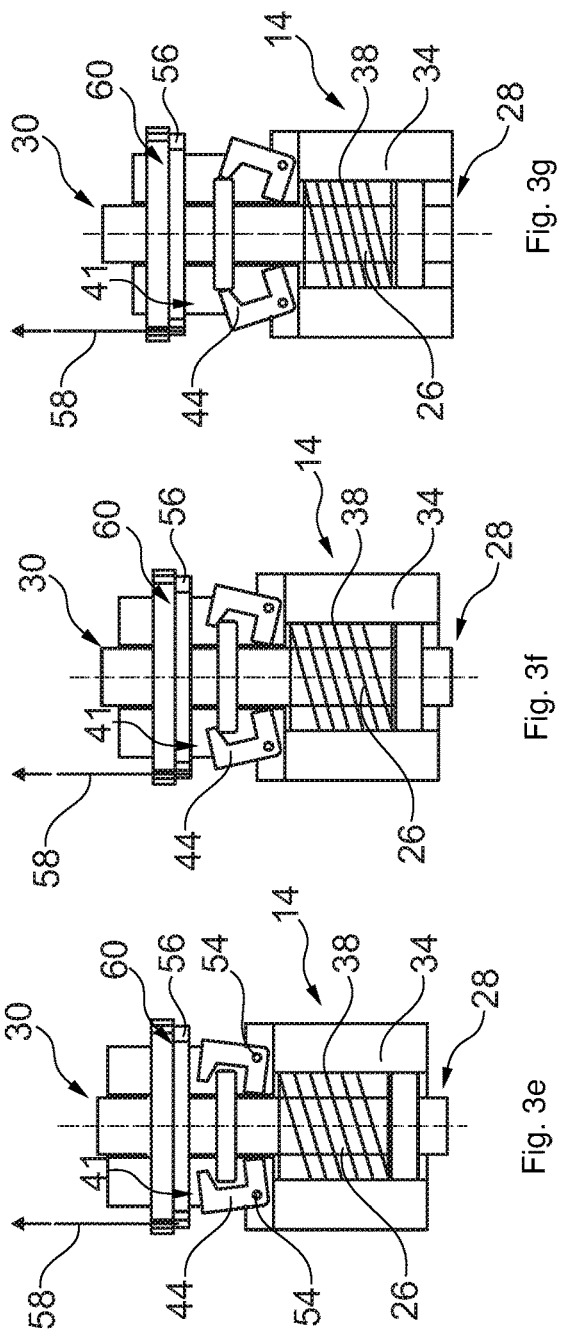

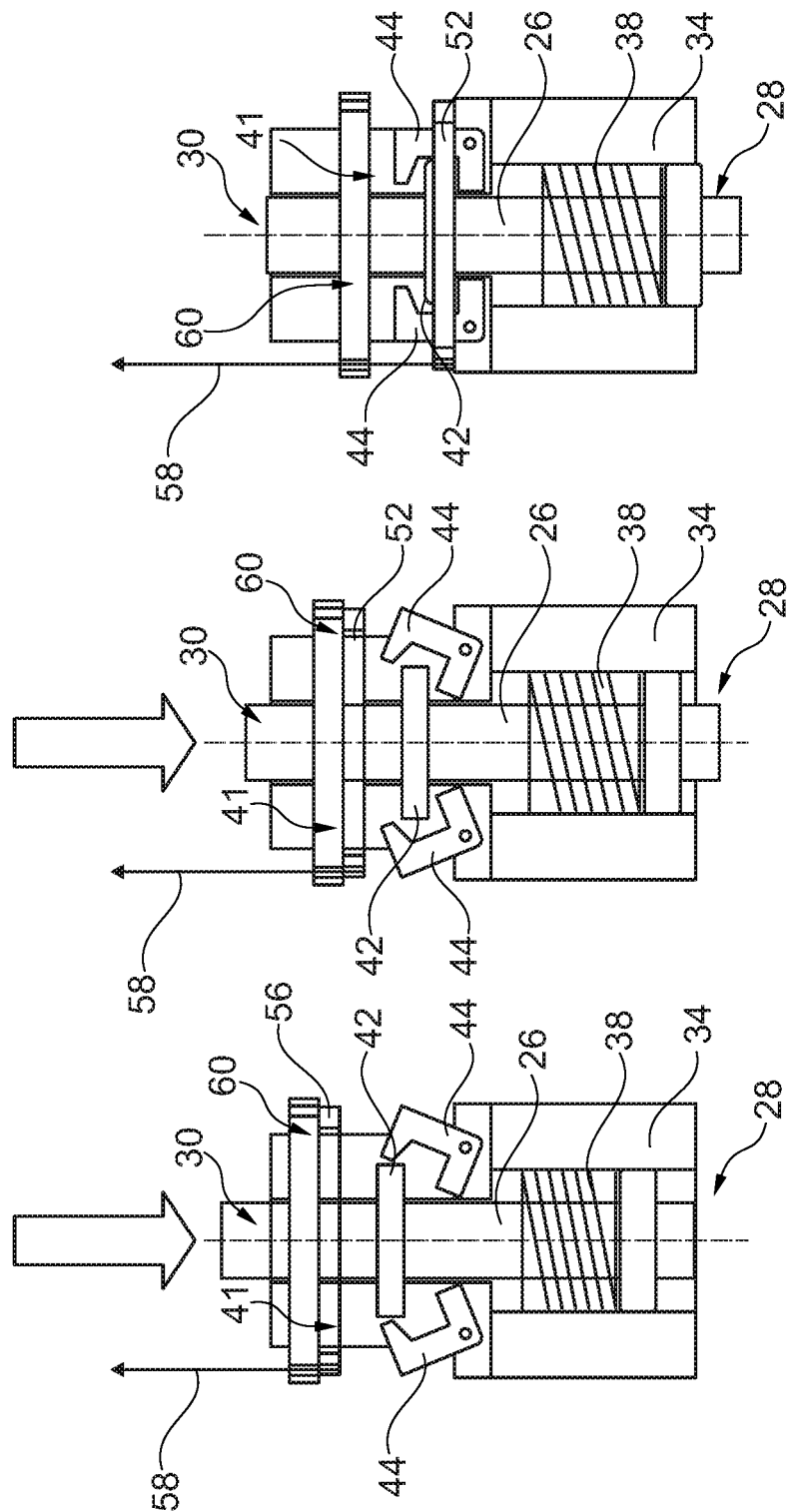

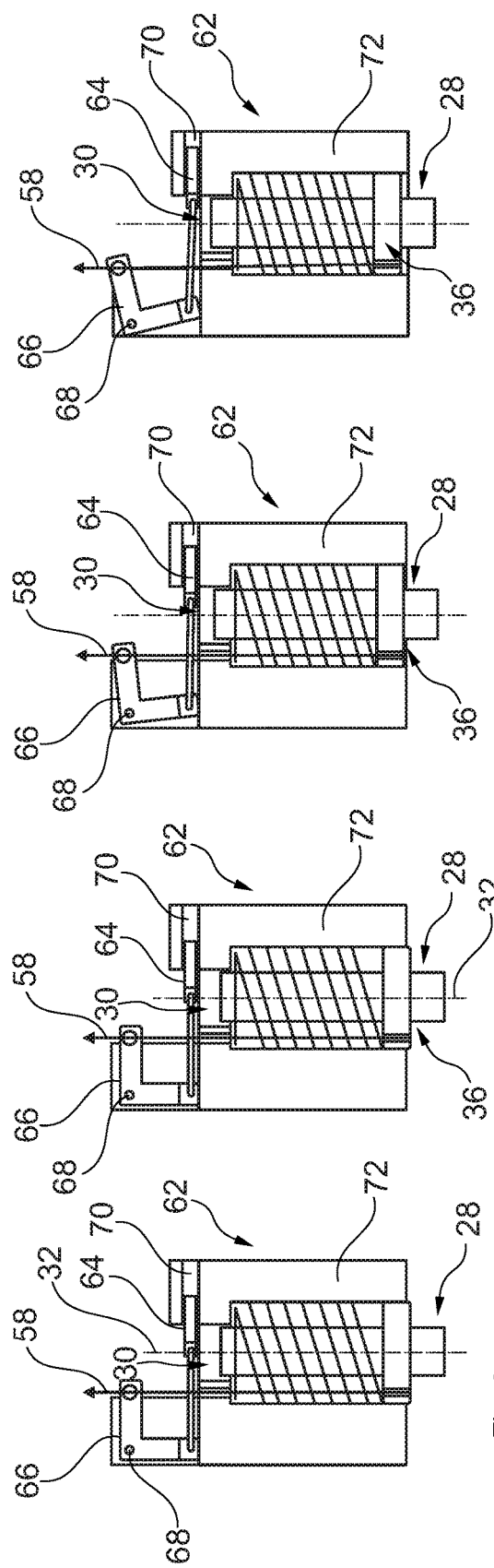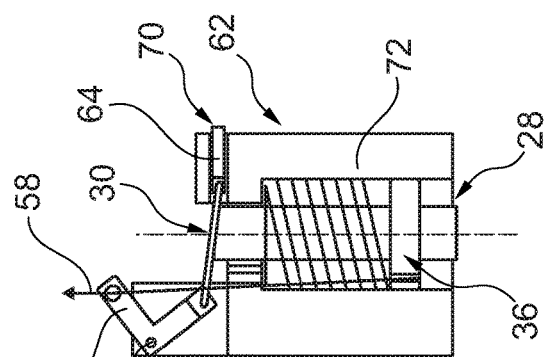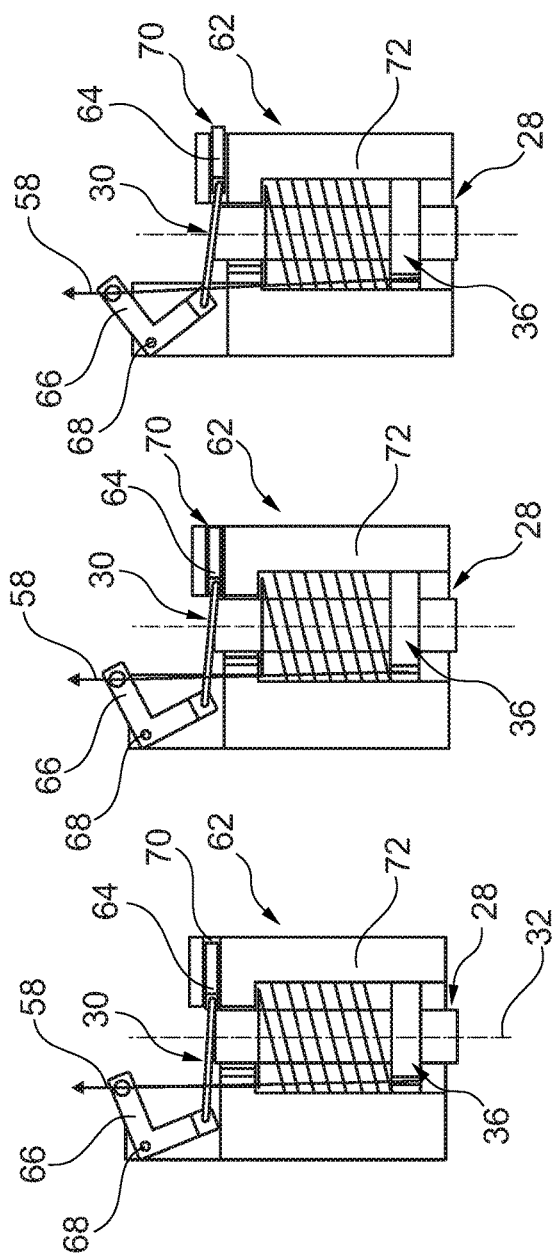

PASSENGER SEAT SYSTEM FOR A MEANS OF TRANSPORT

FIELD OF THE INVENTION

The invention relates to a passenger seat system for a means of transport, and to a transport means, in particular an aircraft, having a passenger cabin and having a passenger seat system installed therein.

BACKGROUND OF THE INVENTION

The passenger cabin of a means of transport, for example of a passenger aircraft, commonly has a construction determined by the operator of the means of transport. The construction may relate in particular to a class division, which is associated with individual seat spacings and a particular number and arrangement of other devices. To realize individual seat spacings, a carrier structure is commonly provided on a cabin floor, which carrier structure permits a rastered fastening of passenger seats and other fixtures. A carrier structure of said type may for example comprise a seat rail arranged on a floor of the cabin, which seat rail is equipped with openings through which a longitudinal slot extends. Fastening means may be arranged at these openings, which fastening means are connected to the passenger seats or other devices.

It is moreover known for fastening means for passenger seats and other fixtures to be provided which permit quick actuation without the use of tools. An operator of the means of transport is thus provided with the facility to quickly change the construction of the cabin in accordance with demand, and adapt seat spacings or class divisions for example in accordance with the mission.

Concepts for realizing a quickly releasable fastening of said type exist. For example, DE 10 2015 116 414 A1 presents a passenger seat system having an arresting device which is arranged on a seat frame and which has a resiliently mounted arresting body which is movable from an arresting position into a release position by means of a Bowden cable. In the arresting position, the arresting body snaps into a corresponding opening, whereas, in the release position, the arresting device is released from the carrier structure.

BRIEF SUMMARY OF THE INVENTION

The use of a resiliently mounted arresting body, and the introduction or snapping thereof into an opening of a carrier structure by means of spring force, is mechanically very simple. However, the service life of a spring suitable for this purpose, which holds the arresting body securely in the opening, may sometimes be too short for an intended service life of the means of transport. If a spring were to exhibit a mechanical defect, this can have the effect that the respective seat, or the respective seat row, is temporarily rendered unusable.

An aspect of the invention relates to a passenger seat system which permits a quick reconfiguration of a cabin and, at the same time, furthermore exhibits a longer service life, or at least a certain degree of redundancy with respect to a defective spring.

A passenger seat system for a means of transport is proposed, having at least one carrier structure which can be attached, fixedly with respect to a structure, in the interior of the means of transport, and has at least one seat which has a seat frame, which seat frame is displaceable and arrestable on the carrier structure and has a bottom side, which lies on the carrier structure, and a top side, which holds a seat surface. The seat frame has an arresting device on the bottom side and has an operating unit, which is coupled to the arresting device, at a position averted from the bottom side. The operating unit is movable at least into an arresting position and an unlocking position and is coupled to a traction mechanism. The arresting device has an arresting body, which arresting body is coupled to the traction mechanism, is movable perpendicularly to the carrier structure, is forced by action of a pressure spring into an engagement position, and can be moved by action of the traction mechanism into a release position. The arresting device has a locking unit which is coupled to the traction mechanism and which locks the arresting body in the engagement position and which releases the locking by action of the traction mechanism.

The carrier structure is to be understood as a base for the fastening of passenger seats and other devices in the cabin of the means of transport. Said carrier structure is a component or an arrangement of components which, by means of the fastening thereof, is fixed with respect to a structure in the interior of the means of transport. The carrier structure may in particular have two floor rails arranged parallel to one another, which are also known as seat rails, and which have a fastening raster. Alternatively or in addition to this, the carrier structure may also have slide rails or slide rail attachments for fastening to a floor rail in order to permit the sliding movement of passenger seats and other devices.

The carrier structure may have a raster in the form of depressions or openings which are arranged with predefined spacings on the carrier structure. Said depressions or openings permit the insertion of the arresting body in order, when the arresting body is in engagement, to prevent movement of the arresting device on the carrier structure. The carrier structure, the depressions or openings and the arresting bodies must, in particular in an aircraft, be designed to pass approval-relevant 16 G load tests. The carrier structure is therefore normally connected fixedly to the structure of the means of transport, and thus permits the adequate introduction of load into the structure.

As mentioned above, the carrier structure may be suitably equipped with guide devices in order to permit easier displacement of a passenger seat or of another device. Said guide devices could be integrated directly into the carrier structure, or, for example in the case of a retrofit solution for existing carrier structures, such as for example floor rails, arranged on these. The function of the guide could be realized for example by means of a preferably centrally arranged slot of a conventional floor rail as carrier structure. Such floor rails are known for example as Douglas rails. A guide device could likewise be realized by means of an additionally or alternatively provided separate sliding guide with two profile cross sections which are coordinated with one another and which engage into one another and which are displaceable along one another.

The seat frame of the at least one seat may correspond to a conventional seat frame for the respective means of transport. In particular, the seat frame may have multiple mutually spaced-apart frame legs, which stand on the carrier structure and which hold bearing elements for bearing seat cushions. In passenger aircraft, for example, a type of construction of a seat frame which has four legs composed of a metallic material, the profile cross section of which has projections for stiffening purposes, has become established. The frame legs may, in cross-sectional regions subjected to relatively low load, be equipped with openings or recesses for the purposes of reducing weight. The bearing elements held by the frame legs could for example comprise one or two horizontally arranged tubes. In the configuration of the seat frame, provision could also be made for multiple seats to be arranged on one single seat frame. It would consequently be possible for the bearing elements to also extend in a lateral direction considerably beyond the seat frame.

In the consideration below, an upper side, which holds a seat surface, of the seat frame is referred to as "top side", whereas a lower side, which is connected to the carrier structure, is referred to as "bottom side". The height of the seat frame and thus the approximate vertical position of the top side of the seat frame are determined by a corresponding seat height for a passenger seat.

The arresting device is to be understood as an apparatus which permits selective arresting of the seat frame to the carrier structure, which apparatus should be releasable as quickly as possible and as far as possible without great expenditure of force, but should be very reliably capable of being arrested again and subjected to the full load on which the design of the seat frame is based.

The operating unit is a device averted from the carrier structure. Said operating unit is preferably arranged on a top side of the seat frame, and therefore so as to face towards a user. It should be possible for the arresting device to be reliably activated or released by means of the operating unit, wherein this should be performed without the use of tools. The operating unit may have in particular a handle, a lever, a button or some other actuating element that can be moved between predefined positions by a user. The coupling with the aid of the traction mechanism transmits the movement from the operating unit to the arresting device in order to move the arresting body situated thereon.

A special feature of the passenger seat system according to an embodiment of the invention lies in the coupling of the locking unit to the traction mechanism. By means of the application of a pulling force to the traction mechanism, it is consequently possible for the arresting device to be influenced such that the locking unit is released, and the arresting body is pulled into its release position.

Here, the traction mechanism is to be understood as a linear movement element which permits a movement along a predefined direction. The traction mechanism may be a linkage or a flexurally soft, flexible component, for example a Bowden cable or a type of chain pull. The aim of the traction mechanism is to reliably introduce a pulling force for applying to the arresting body a force which exceeds the pressure force of the spring, such that said arresting body can be released from the arresting position.

The locking unit should consequently be designed such that it can be released by application of a pulling force. For this purpose, numerous variants exist, which will be discussed in the following embodiments.

Altogether, by means of the passenger seat system according to an embodiment of the invention, a reliable arresting action which can be implemented quickly and without the use of tools, and a quick release, of a passenger seat in a means of transport is made possible. By means of the above-stated features, a longer service life is realized, and the successful arresting of an arresting body is dependent not exclusively on the force action of a spring.

In one advantageous embodiment, the locking unit is coupled to the arresting body such that, in the case of the arresting body being moved manually from a release position into an arresting position, the locking unit locks. Should a defect of the pressure spring occur, it is nevertheless possible, by manual movement of the arresting body, to implement reliable locking which prevents the movement of the arresting body into a release position.

In this context, it is advantageous in particular for the arresting body to be designed such that an actuation end, which is arranged opposite an engagement end of the arresting body, projects out of the arresting device, such that, by manual application of a pressure force to the actuation end, the arresting body is moved from the release position into the arresting position. In this way, a defect of the pressure spring is not of significance for the fastening of the seat frame to the carrier structure.

In one advantageous embodiment, the locking unit has at least one radial projection on the arresting body and has movably mounted locking claws which, in the arresting position, enter into engagement with the radial projection and are blockable in their position in engagement with the radial projection. The locking claws are preferably rigid elements which are mounted movably at one end for example by means of a hinge or a joint. The locking claws should furthermore have an engagement region which has a profile corresponding to the radial projection. By means of the movable mounting, the locking claws can in particular be pivoted from a radially outer position to a position which holds the radial projection, and in which the radial projection lies in the respective profile of the respective locking claw. The locking claws are preferably designed such that, in the engagement with the radial projection, a mechanical stop is formed for said locking clause, which mechanical stop lies on a side of the arresting body averted from the engagement end. A movement of the arresting body of its own accord into a release position can thus be prevented.

It is preferable for at least two locking claws to be arranged symmetrically with respect to one another about the arresting body. Through the use of two or more locking claws, a symmetrical introduction of force into the radial projection is realized, which can counteract a misalignment. It may furthermore be preferable for the radial projection to be of a plate-like design, which fully surrounds the arresting body. Inexact positioning of the locking claws is then not of significance, and the manufacture of the arresting device is furthermore simplified.

In a particularly advantageous embodiment, the locking claws have a C-shaped structure which has two substantially parallel limbs with an interposed web, wherein the radial projection enters into engagement between the limbs of the locking claws. It is thereby made possible to implement automatic locking of the locking claws even in the absence of the action of a pressure spring. During the movement of the arresting body, the radial projection makes areal contact with those limbs of the locking claws which are directed towards the engagement end, such that these move jointly with the radial projection and ultimately lead to the pivoting of the locking claws into the locking position.

In one advantageous embodiment, a ring-shaped securing element is provided which can be moved along the arresting body and which, in a locking position of the locking claws, forms a radial form fit with the locking claws, such that the locking claws cannot be moved out of their locking position in a radial direction. The ring-shaped body may loosely surround the arresting body and be designed such that, during the movement of the arresting body into the arresting position and during the radial pivoting of the locking claws into a locking position, the ring-shaped component slides over the locking claws and thereby encloses the radial mobility thereof. By means of an attachment to the traction mechanism, said element can consequently be moved into a position which releases the locking claws. This principle is mechanically very simple and nevertheless reliable.

It is advantageous if the arresting body has a stop surface, which is averted from the engagement end and which is spaced apart from the radial projection and against which the ring-shaped securing element abuts when the traction mechanism pulls the ring-shaped securing element away from the engagement end and the radial form fit with the locking claws is released. By means of the coupling of the securing element to the traction mechanism, a movement of the arresting body is consequently initiated after release of the locking.

In an alternative embodiment, the locking unit has a locking pin which is arranged so as to be displaceable perpendicularly with respect to the arresting body between a position which blocks the arresting body and a position which releases the arresting body, which locking pin is connected to a pivot lever which is coupled to the traction mechanism. The locking pin can consequently, when the seat frame is arranged on the carrier structure, be moved in a horizontal direction towards the arresting body or away from the arresting body. By means of the pivot lever, a diversion of the movement of the traction mechanism to realize the movement of the securing pin is possible. The pivot lever may for example be of L-shaped design and have a pivot axis at an interface between the limbs. The locking pin may be designed to protrude into a correspondingly shaped depression of the arresting body. The depression may furthermore also be situated on a component which is connected to the arresting body. However, the locking pin may also be designed to be moved into the movement travel of the arresting body such that, in particular, an end averted from the engagement end can make areal contact with said arresting body. In this way, reliable locking of the arresting body is realized, wherein, at the same time, through the use of the pivot lever, a direct release of the locking pin is realized when the traction mechanism is pulled.

In a preferred embodiment, the pivot lever or the locking pin is arranged such that a manual movement of the pivot lever or of the locking pin is readily possible. Should the pressure spring have a defect, the manual actions required for unlocking can also be performed directly on the arresting device. It is however also worth mentioning in this context that, with the use of a Bowden cable, a pressure force can also be transmitted, at least over short distances. With the use of the locking unit of this embodiment, it would also be possible for the locking to be performed by means of a Bowden cable. Then, in order to protect against inadvertent actuation, it is necessary to consider using a cover and/or providing for an exclusively tool-based release of the locking unit.

The arresting device preferably has a housing which is of bushing-like form at least in sections and which has a depression, radially lateral with respect to the arresting body, for receiving the locking pin, wherein an axial position of the depression lies between the locations assumed by an actuation end of the arresting body in a release position and in an arresting position, wherein the actuation end is averted from the engagement end. The locking pin can therefore block the travel of the arresting body from the arresting position into the release position.

The pivot lever is particularly preferably of L-shaped design, wherein, in a locking position of the locking unit, a distance between an attachment point of the pivot lever to the traction mechanism and an attachment point of the arresting body runs parallel to a main extent direction of the arresting body. The attachment to the traction mechanism consequently does not involve any sharp diversions, and a misalignment-free movement of the components can be ensured.

The invention furthermore relates to a means of transport having a cabin and having at least one passenger seat system with the above-described features formed therein.

The means of transport may be an aircraft. The means of transport may furthermore have service units above passenger seats, wherein the number of service units corresponds at least to the maximum possible number of passenger seats situated therebelow. A service unit could be understood to mean a device which has various displays, for example for a seatbelt fastening command or a non-smoking signal, a loudspeaker for announcements, an air nozzle, a container for oxygen masks and the like, and which correlates in each case with passenger seats situated therebelow. It is particularly advantageous if the number of service units corresponds at least to a maximum possible number of passenger seats situated therebelow in the respective region, such that, in the event of displacement of the passenger seats or in the event of a change of the seats spacings, a displacement of the service units is not necessary. It is furthermore conceivable to provide a number of service units which even exceeds the maximum possible number of passenger seats. Coverage of each passenger seat can consequently be ensured regardless of the spacings formed in between them. Depending on the respective region in the cabin that is to be equipped with the passenger seat system, it is possible to realize a certain overdeterminacy by virtue of the number of service units slightly exceeding the maximum number of passenger seats, wherein an excess of 5 to 10% would be conceivable, though this may also be greater or smaller.

BRIEF DESCRIPTION OF THE DRAWINGS

Further features, advantages and possible uses of the present invention will emerge from the following description of the exemplary embodiments and from the figures. Here, all of the features described and/or illustrated in the figures form the subject matter of the invention individually and in any desired combination, even independently of the combination of said features in the individual claims or the back-references thereof. Furthermore, in the figures, the same reference designations are used for identical or similar objects.

FIG. 1 shows a passenger seat system in a three-dimensional illustration.

FIGS. 2a to 2c show an arresting device in three different views.

FIGS. 3a-3g show the sequence of an arresting process with the aid of a locking device as per FIGS. 2a to 2c, whereas FIGS. 4a-4c show the sequence of a manual arresting process.

FIGS. 6a-6g show the course of an arresting process of this alternative arresting device, whereas

DETAILED DESCRIPTION

Figure 5A:
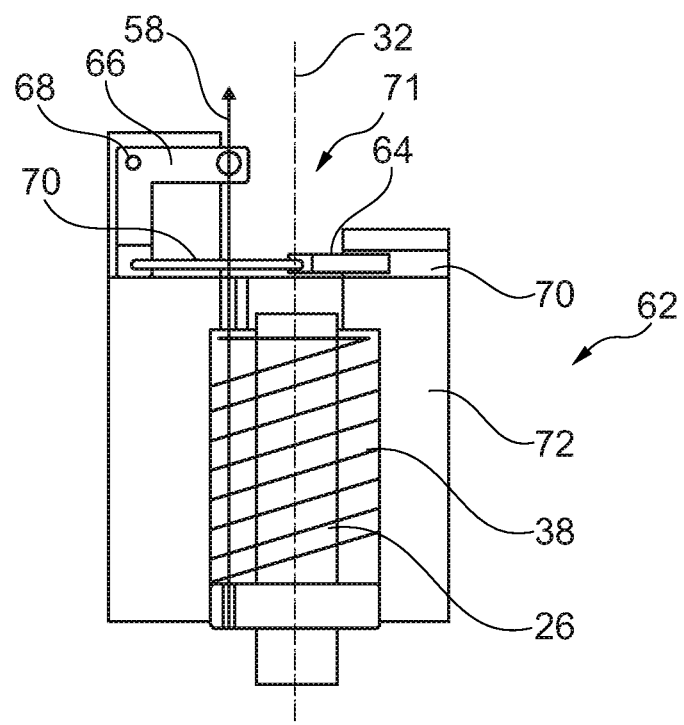
FIGS. 5a and 5b show an alternative arresting device in two different illustrations.
Figure 5B:
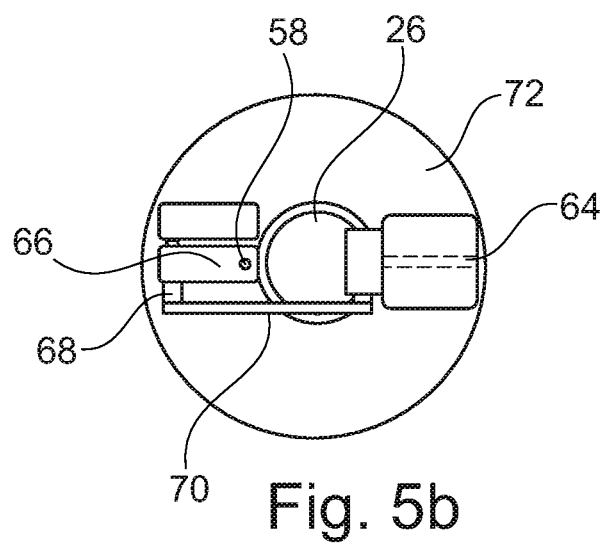

FIG. 1 shows a passenger seat system 1 having a passenger seat 2 with a seat surface 4, with a backrest 6, and with a seat frame 8, which seat frame lies with a bottom side 10 on a carrier structure 12 and is connected to the latter means of an arresting device 14. The details will be presented in various illustrations in the further following figures.

The seat frame 8 has front seat legs 16, rear seat legs 18 and bearing tubes (not shown) held by the seat legs 16, 18. A diagonal strut 20 connects the front seat legs 16 to the rear seat legs 18 and increases the stiffness of the seat frame 8. On a top side 22 of the seat frame 8, a part of an operating unit 24 is indicated. This can, by means of an operating lever (not illustrated here) or some other operating element, apply a pulling force to a traction mechanism (not shown).

FIGS. 2a to 2c show the arresting device 14 in three different views. An arresting body 26 with an engagement end 28 and with an actuation end 30 is mounted, so as to be displaceable along a vertical axis 32, in a section of a housing 34. A shoulder in the form of a plate on the arresting body 26 is in areal contact with a pressure spring 38, which is furthermore supported on another shoulder 40 in the interior of the housing 34. Consequently, the arresting body 26 is at all times subject to a force which pushes the engagement end 28 in the direction of the carrier structure 12.

The arresting device 14 has a locking unit 41. For this purpose, the arresting body 26 has a radial projection 42, which is designed in the form of a disc-like or plate-like component. Said projection is designed to engage with locking claws 44 and be held by these. The locking claws 44 and the radial projection 42 formed the locking unit 41.

The locking claws 44 are arranged symmetrically radially around the arresting body 26, and are of approximately C-shaped design. This means that two limbs 46 and 48 running substantially parallel to one another enclose a web 50 between them, and form a receiving section 52. The radial projection 42 can enter said receiving section 52. If said radial projection is situated between two locking claws 44 which are situated in the position shown in FIG. 2b, the radial projection 42 can practically no longer be moved along the vertical axis 32. The arresting body 26 is consequently locked.

The locking claws 44 are in each case pivotably mounted, at an end facing towards the engagement end 28, so as to be pivotable about a horizontal axis 54, such that the upper limb 48 can move radially outwards. If this is the case, the radial projection 42 of the arresting body 26 can be released, such that the arresting body 26 is movable along the vertical axis 32. In FIGS. 2a to 2c, however, the locking position of the locking claws 44 is blocked by means of a ring-shaped securing element 56, which surrounds the locking claws 44 radially at the circumference. The locking claws 44 can be pivoted open only once the ring-shaped securing element 56 has been removed from this position.

A traction mechanism 58 which is coupled to the operating unit 24 from FIG. 1 is attached to the ring-shaped securing element 56. If a pulling force is applied to the traction mechanism 58, the ring-shaped securing element 56 moves along the vertical axis 32 in a direction away from the engagement end 28. The ring-shaped securing element 56 is moved as far as a stop surface 60, wherein, in this position, the locking claws 44 are already out of engagement. If a pulling force continues to act, the ring-shaped securing element 56, by way of the areal contact with the stop 60, pulls the arresting body 26 out of the engagement position shown in FIG. 2b into a release position, in which the engagement end 28 of the arresting body 26 is released from the carrier structure 12. The intermediate space between the upper limbs 48 of the locking claws 44 and the stop surface 60 is sufficient for accommodating the ring-shaped securing element 56 and releasing the locking of the locking claws 44.

The locking claws 44 are furthermore equipped, at their upper end, with a bevelled surface 62 by means of which the locking claws 44, when they come into contact with the radial projection 42, are moved radially outwards and release the engagement with the radial projection 42.

FIG. 2c shows that the stop surface 60 does not imperatively need to be circular or disc-shaped, but could also be formed merely as a web. It would also be conceivable to realize merely a pin, which is placed perpendicularly through the arresting body 26.

FIGS. 3a-3g show the sequence of an unlocking process and the release of the arresting device 14 in multiple partial illustrations. In the partial illustration 3a, the arresting device 14 is in an engagement position, and the locking claws 44 are in a locking position and are held by the ring-shaped securing element 56. No pulling force is introduced into the traction mechanism 58.

In the partial illustration 3b, a pulling force is applied to the traction mechanism 58, and the ring-shaped securing element 56 moves away from a top side of the housing 34. The ring-shaped securing element 56 moves until it arrives at the stop surface 60, as shown in FIG. 3c. In this position, the locking claws 44 are no longer locked.

A continued introduction of the pulling force into the traction mechanism 58 has the effect that, via the stop surface 60, the arresting body 26 begins to move conjointly. The pulling force must in this case exceed the pressure force of the pressure spring 38.

In FIG. 3d, the radial projection 42 reaches the bevelled surfaces 62 of the locking claws 44, which then move radially outwards about their respective pivot axis 54. This is illustrated in the partial illustrations 3e-3g. In the partial illustration 3g, the engagement end 28 of the arresting body 26 reaches the release position, in which the engagement end 28 is arranged entirely within the housing 34.

As shown in FIGS. 4a-4c, the manual actuation of the arresting device 14 is illustrated. Here, a pressure force is applied to the actuation end 30 of the arresting body, which leads to a downwards movement of the arresting body 26 and, here, by means of the radial projection 42, moves the locking claws 44 into a locking position. As soon as the engagement end 28 reaches the arresting position, the radial projection 42 is fully surrounded by the locking claws 44. The actuation end 30 has then disappeared completely in the housing 34. When the traction mechanism 58 is relieved of stress, the ring-shaped securing element 56 moves back into its position in which it circumferentially surrounds the locking claws 44.

Here, a different arresting device 62 is shown, in the case of which a securing pin 64 is movable perpendicular to the vertical axis 32. The securing pin 64 is connected to a pivot lever 66, which, by way of example, is of L-shaped design. The pivot lever 66 is mounted pivotably about a pivot axis 68 and is coupled to the traction mechanism 58. By means of the L-shaped design of the pivot lever 66, the substantially vertical movement of the attraction mechanism 58 is converted into a substantially horizontal movement of a linkage 70, which in turn moves the locking pin 64. A locking unit 71 is thus formed.

The arresting body 26 is likewise coupled to the traction mechanism 58 and can, by application of a pulling force to the traction mechanism 58, be released from its arresting position shown in FIG. 5a. Here, the pressure force of the pressure spring 38 must likewise be overcome again. When the traction mechanism 58 is pulled, the locking pin 64 is moved into an unlocking position, in which it practically completely disappears into a corresponding depression 70 of a housing 72. The arresting body 26 can then follow the movement of the traction mechanism 58. The pivot lever 66, the linkage 70 and the position of the pivot axis 68 permit a flowing movement, in which the unlocking and the moving of the arresting body 26 directly follow one another. It should be noted in particular that the coupling of the arresting body 26 to the traction mechanism 58 is of flexurally soft design, such that, for example, a relatively rigid wire as a connecting means does not have the effect that the locking pin 64 is inadvertently moved in the case of a defective pressure spring 38 and in the presence of a force acting on the arresting body 26.

FIGS. 6a-6g shows, analogously to FIGS. 3a-3g, the process of the opening of the arresting device 62. In partial illustration 6a, the traction mechanism 58 is not loaded. In the partial illustration 6b, a pulling force is applied to the traction mechanism 58, such that the pivot lever 66 is set in motion. The pivot lever 66 moves continuously from the partial illustrations 6b to 6g. In the partial illustration 6e, the locking pin 64 is already in such a position in the depression 70 that the arresting body 26 can be moved freely upwards through the housing 72. In partial illustration 6g, said arresting body reaches its release position.

Figures 7A, 7B, 7C:
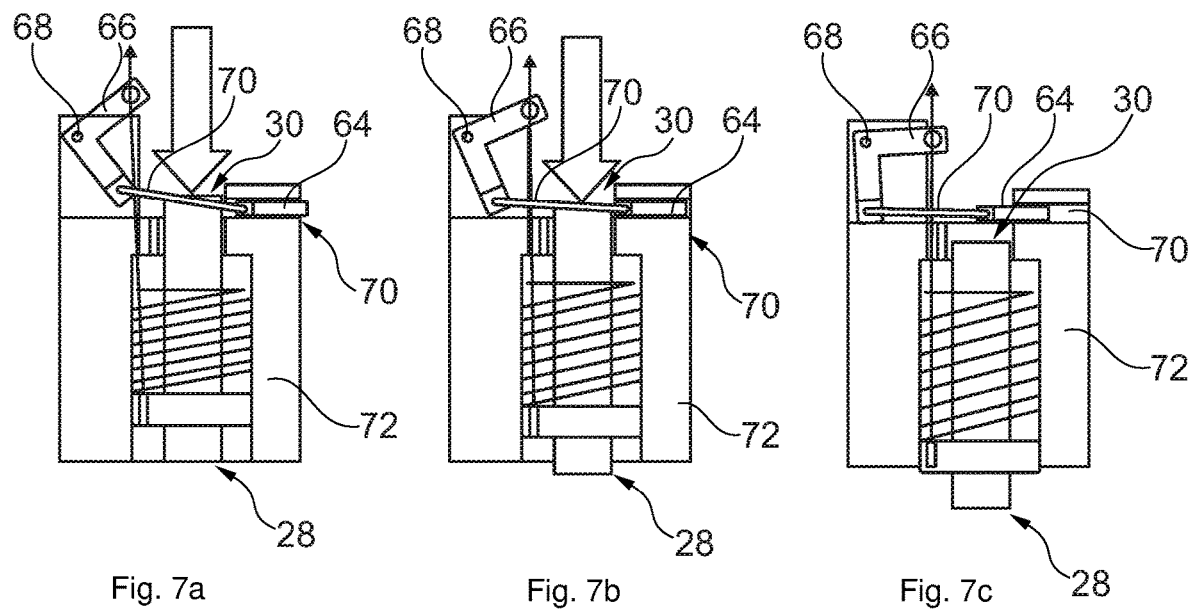
FIGS. 7a-7c show the course of a manual arresting process.

FIGS. 7a-7c illustrate the manual actuation of the arresting device 62, in the case of which an actuation end 30 can, analogously to the preceding exemplary embodiment, be pushed manually in the direction of the carrier structure 12. By means of the coupling of the arresting body 26 to the pivot lever 66, automatic locking of the arresting body occurs when the engagement end 28 reaches its engagement position.

Figure 8:
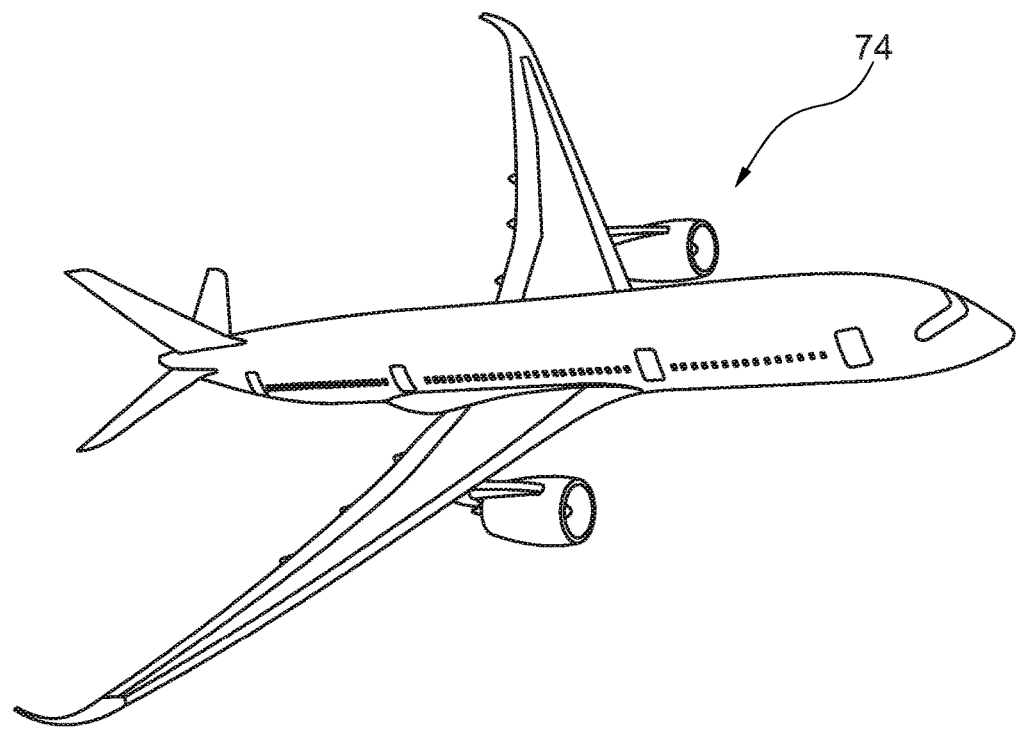
FIG. 8 shows an aircraft with a passenger seat system installed therein.

Finally, FIG. 8 shows an aircraft 74 with a cabin formed therein, which cabin has at least one passenger seat system with the features mentioned above installed therein.

It is additionally pointed out that "having" does not rule out other elements or steps, and "a" or "an" do not rule out a multiplicity. It is also pointed out that features that have been described with reference to one of the above exemplary embodiments may also be used in combination with other features of other exemplary embodiments described above. Reference designations in the claims are not to be regarded as limiting.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A passenger seat system for a means of transport, comprising:
   at least one carrier structure configured to be attached, fixedly with respect to a structure, in the interior of the means of transport; and
   at least one seat having a seat frame, the seat frame being displaceable and arrestable on the carrier structure and having a bottom side, lying on the carrier structure, and a top side holding a seat surface,
   wherein the seat frame has an arresting device on the bottom side and has an operating unit, coupled to the arresting device, at a position averted from the bottom side,
   wherein the operating unit is movable at least into an arresting position and an unlocking position and is coupled to a traction mechanism,
   wherein the arresting device has an arresting body, the arresting body being coupled to the traction mechanism, being movable perpendicularly to the carrier structure, being forced by action of a pressure spring into an engagement position, and configured to be moved by action of the traction mechanism into a release position, and
   wherein the arresting device has a locking unit coupled to the traction mechanism and configured to lock the arresting body in the engagement position and to release the locking by action of the traction mechanism.

2. The passenger seat system according to claim 1, wherein the locking unit is coupled to the arresting body such that, in the case of the arresting body being moved manually from a release position into an arresting position, the locking unit locks.

3. The passenger seat system according to claim 2, wherein the locking unit has at least one radial projection on the arresting body and has movably mounted locking claws which, in the arresting position, enter into engagement with the radial projection and are blockable in their position in engagement with the radial projection.

4. The passenger seat system according to claim 3, wherein at least two locking claws are arranged symmetrically with respect to one another about the arresting body.

5. The passenger seat system according to claim 3, wherein the locking claws have a C-shaped structure having two parallel limbs with an interposed web, and wherein the radial projection enters into engagement between the limbs of the locking claws.

6. The passenger seat system according to one of claim 3, wherein the arresting device has a ring-shaped securing element movable along the arresting body and, in a locking position of the locking claws, forming a radial form fit with the locking claws.

7. The passenger seat system according to claim 6, wherein the arresting body has an engagement end engaging into the carrier structure, and has a stop surface, averted from the engagement end and spaced apart from the radial projection and against which the ring-shaped securing element abuts when the traction mechanism pulls the ring-shaped securing element away from the engagement end and the radial form fit with the locking claws is released.

8. The passenger seat system according to claim 1, wherein the locking unit has a locking pin arranged so as to be displaceable perpendicularly with respect to the arresting body between a position which blocks the arresting body and a position which releases the arresting body, the locking pin being connected to a pivot lever coupled to the traction mechanism.

9. The passenger seat system according to claim 8, wherein the pivot lever or the locking pin is arranged on the arresting device such that a manual movement of the pivot lever or of the locking pin (64) is made possible.

10. The passenger seat system according to claim 8,
wherein the arresting device has a housing of a bushing-like form at least in sections and having a depression, radially lateral with respect to the arresting body, for receiving the locking pin, and
wherein an axial position of the depression lies between the locations assumed by an actuation end of the arresting body in a release position and in an arresting position, wherein the actuation end is averted from an engagement end that engages into the carrier structure.

11. The passenger seat system according to one of claim 8,
wherein the pivot lever is of L-shaped design, and
wherein, in a locking position of the locking unit, a distance between an attachment point of the pivot lever to the traction mechanism and an attachment point of the arresting body runs parallel to a main extent direction of the arresting body.

12. A means of transport, having a cabin and having at least one passenger seat system according to one of claim 1 formed therein.

13. The means of transport according to claim 12, wherein the means of transport is an aircraft.

14. The means of transport according to claim 12, further comprising service units above passenger seats, wherein a number of service units corresponds at least to a maximum possible number of passenger seats situated therebelow.

\* \* \* \* \*